United States Patent [19]
Rubio

[11] 3,859,449
[45] Jan. 7, 1975

[54] TORTILLA AND PROCESS USING ACETIC AND PROPIONIC ACIDS

[75] Inventor: Manuel Jesus Rubio, Bridgeport, Conn.

[73] Assignee: Roberto Gonzalez Berrera, Vista Hermosa, Monterrey, Mexico

[22] Filed: July 24, 1970

[21] Appl. No.: 58,138

[52] U.S. Cl.................. 426/151, 426/323, 426/152
[51] Int. Cl................ A23b, A21d 4/00, A23l 3/34
[58] Field of Search........ 99/80, 90 P, 93, 153, 222, 99/224; 426/151, 323

[56] References Cited
UNITED STATES PATENTS
2,484,893  2/1952  Lloyd et al.............................. 99/93
3,510,317  5/1970  Fernholz et al. .................... 99/90 P

OTHER PUBLICATIONS

Zelayeta, "Elena's Secrets of Mexican Cooking," Prentice-Hall, Inc., Englewood Cliffs, N.J., March 1962, pages 115–121.

*Primary Examiner*—Raymond N. Jones
*Attorney, Agent, or Firm*—Jackson, Jackson & Chovanes

[57] ABSTRACT

To retard the staling and to retard or prevent microbiological spoilage of tortillas, which are an unleavened unshortened food product made from nixtamalized corn or corn flour by incorporating an additive in making the tortilla dough. The additive is acetic or propionic acid or acid anhydride.

9 Claims, No Drawings

TORTILLA AND PROCESS USING ACETIC AND PROPIONIC ACIDS

DISCLOSURE OF INVENTION

The present invention relates to retarding the staling of tortillas and to prevent microbiological spoilage of tortillas.

Many expedients which apply for preventing staling to the usual wheat, whole wheat or rye bread, commonly eaten, are not effective when applied to tortillas because of the marked differences in their composition from the breads mentioned above. Among these differences are:

1. Tortillas are made from whole corn, that is, corn which contains its germ, hull, bran, etc. Bread is made from dehulled, degermed and debranned wheat.
2. Dehulled, degermed, debranned wheat used in making bread undergoes no chemical treatment before grinding. Whole corn used in making tortillas always undergoes the chemical treatment of steeping in limewater at pH 12 before grinding.
3. Dehulled, degermed, debranned wheat used in making bread is ground into a flour in the dry state. Steeped whole corn used in making tortillas is ground into a dough in the wet state, after which the dough is either dried into a flour or used directly to make tortillas.
4. The dough used for making bread is always prepared from dry dehulled, degermed, debranned wheat flour. The dough used for making tortillas may be prepared either from dry limed whole corn flour or directly by grinding whole corn steeped in limewater at pH 12.
5. In addition to dehulled, degermed, debranned wheat flour, the dough used for making bread always contains some of the following ingredients: shortening, a leavening agent (yeast, air, or baking powder), salt, sugar, milk solids or milk, eggs or egg solids, and water. Dough used if making tortillas only contains ground limed whole corn and water.
6. The final moisture content of bread after baking is approximately 20%; that of tortillas after cooking is approximately 45%. Due to its lower moisture content, bread is much less subject to microbial spoilage than tortillas.
7. Bread is baked inside an oven by hot air at a temperature of 425°–500° F. for 30 to 60 minutes. Tortillas are cooked on a hot plate at 290°–410° F., each side or face being exposed alternately to the heat for 15 to 20 seconds, after which the first side is again exposed for an additional 15 to 20 seconds.
8. Other differences between bread and tortillas are the following:
   a. Dehulled, degermed, debranned wheat flour used in breadmaking is usually bleached; limed corn flour used for making tortillas is never bleached.
   b. Bread is usually leavened; tortillas are never leavened.
   c. Bread is always baked in the shape of loaves or rolls; tortillas are always shaped in the form of round, flat discs.
   d. The structure of bread is largely due to the presence of proteins known as "glutelin and gliadin" which are components of dehulled, degermed, debranned wheat. Corn contains no such protein, so that the structure of tortillas is due mostly to their starch component.

The base material for making tortillas is limed corn dough, whose preparation is described below.

Flat discs of dough of diameter 4 to 6 inches and height 2 to 3 millimeters are prepared either by hand, by use of any mechanical equipment which squashes or presses pieces of dough, or by any suitable automatic machine.

After they have been made, the flat discs of dough are cooked on a hot plate whose temperature varies from 290°–410°F. In the cooking process, each face or side of the disc is alternately exposed to the heat for 15 to 20 seconds, after which the first side is again exposed for an additional 15 to 20 seconds.

The cooked discs or tortillas have a moisture content of 40 to 48% and are ready to eat.

Limed corn dough may be prepared from limed corn flour of size smaller than 45 U.S. Standard Mesh, 8 to 12% moisture content and pH 6–7. The dough is made by mixing 1.0 to 1.4 pounds of tap water per pound of flour.

Limed corn dough may also be made directly by grinding corn which has been steeped in limewater. In such case 1 pound of corn is steeped overnight in 0.5 to 1.5% calcium hydroxide. It should be noted that when the corn is added to the limewater, the latter is either at or close to its boiling temperature. However, after both ingredients have been mixed, no further heat is applied so that the temperature of the mixture drops gradually during the steeping process.

It might be mentioned that tortillas, when normally prepared as described herein and without additives of any kind, have a maximum shelf life of 12 to 14 hours. After such time they are spoiled by microorganisms and become hard or stale.

It is known that tortillas when kept under conditions in which no moisture is lost, nevertheless become hard and inflexible with the passage of time and break or crumble easily when flexed or bent. This effect increases with time. Freshly made tortillas are very flexible but lose their flexibility with the passage of time. Hardening is appreciable after 24 hours, marked after 48 hours and almost complete after 72 hours if the product is kept at room temperature. It should be noted that the hardening or staling effect increases with decreasing temperature until the freezing point of water in the product is reached. At temperatures below room temperature but above the freezing point of water in the tortillas, therefore, hardening proceeds at a faster rate than at room temperature and vice-versa.

In determining the flexibility index a tortilla is bent around a bar of known radius, and this is tried with successively smaller bars until a bar is found which is the smallest around which the tortilla just breaks when it is flexed. A more flexible tortilla will just break when it is bent around a smaller bar than a less flexible tortilla. A higher flexibility index corresponds therefore to bars of lower radii and indicates higher flexibility.

Table 1 gives typical values for variation of the flexibility index of tortillas with time at room temperature.

Table 1

Variation of the Flexibility Index of
Tortillas with Time at Room Temperature

| Flexibility index after the following elapsed time | | | | |
|---|---|---|---|---|
| 0 hr. | 24 hr. | 48 hr. | 72 hr. | 96 hr. |
| 9.5 | 7.7 | 6.5 | 6.0 | 5.5 |

Hardening or loss of flexibility of tortillas is believed to be due to a physico-chemical change in the starch constituent of tortillas which is known as retrogradation. This phenomenon has been studied in substances other than tortillas and is described in the technical literature (Whistler 1965).

The additive of the present invention imparts the property of retarding the loss of flexibility of tortillas with time. It must be mixed with the dough used for making tortillas, although as later explained, the mixture may be achieved in various ways.

Thus, in respect to this aspect of the invention, tortillas stored under conditions in which no moisture is lost from them become stale more slowly because of the additive of the invention, which retards hardening with time, retards loss of flexibility with time, increases the freshness of the tortillas, prolongs the flexible shelf life of the tortillas and increases the freshness of both freshly made tortillas and also reheated tortillas. The invention also contributes to retard or prevent microbiological spoilage of dough or tortillas made from limed corn and/or limed corn flour. Limed corn dough and tortilla, because of their relatively high moisture content, are very susceptible to attack and spoilage by bacteria, yeasts, molds, and other microorganisms. Limed corn dough has a higher moisture content than tortillas and therefore is more susceptible to such spoilage.

Table 2 gives typical moisture contents and shelf lives for limed corn dough and tortillas.

Table 2

Typical Moisture Contents and Shelf Lives at
25°C for Limed Corn Dough and Tortillas Without
Additives of Any Kind

| Product | Moisture Content | Shelf Life at 25°C |
|---|---|---|
| Dough | 55–60% | 6 hours |
| Tortillas | 42–48% | 12 hours |

The shelf life is the time required to detect unmistakable signs of microbiological spoilage in the product. In limed corn dough and tortillas these signs are indicated by the production of off-flavors and odors and the production of "rope" (a polysaccharide resulting from the growth of certain bacteria such as B.mesentericus) and from the appearance of moldy spots.

The shelf life of a product appears to depend upon the temperature at which it is stored. At higher temperatures lower shelf life is obtained and vice versa. The type of spoilage which occurs depends on the temperature. In limed corn dough and tortillas the first signs of spoilage at higher temperatures (above 30°C.) are usually off-flavors due to growth of bacteria. At temperatures below 30°C. the first signs are appearance of moldy spots.

Table 3 gives typical shelf lives of limed corn dough and tortillas at different temperatures.

Table 3

Typical Shelf Lives of Limed Corn Dough and
Tortillas at Different Temperatures

| Product | Storage Temperature | Shelf Life |
|---|---|---|
| Dough | 37°C | 3 hours |
|  | 25°C | 6 hours |
|  | 15°C | 12 hours |
| Tortillas | 37°C | 6 hours |
|  | 25°C | 12 hours |
|  | 15°C | 18 hours |

Acetic and Propionic Acids

The starch in the nixtamalized corn flour can be substituted by incorporating therein from 1 to 4% by weight of acetic acid or propionic acid or their anhydrides. This increases the flexibility of tortillas made from dough in which one of these acid materials is an additive after extended storage without loss of moisture.

The results obtained by thus acetylating the starch in the limed corn flour are set forth in Table 4.

Table 4

Typical Flexibility Values at Room
Temperature Obtained by Addition of
Acetic Anhydride to Tortillas

| Dose of Acetic Anhydride Based on Weight of Tortillas | Flexibility Index after | | | |
|---|---|---|---|---|
|  | 0 hr. | 24 hr. | 48 hr. | 72 hr. |
| 0% | 8.0 | 6.7 | 6.0 | 5.5 |
| 1% | 8.5 | 7.0 | 6.0 | 6.0 |
| 2% | 8.5 | 7.3 | 6.5 | 6.3 |
| 4% | 8.5 | 8.3 | 8.0 | 7.8 |

The acetic or propionic acid or anhydride is preferably added to the water making up the dough or to the dough in the form of an aqueous solution that is then incorporated homogeneously. The effect on flexibility is pronounced but not so pronounced as in the case of other additives.

Lower Fatty Acids to Prevent Microbiological Spoilage

In order to retard or prevent microbiological spoilage of tortilla dough or torillas, low molecular weight fatty acids containing from 1 to 4 carbon atoms, and/or their anhydrides and/or their water soluble salts, including formic, acetic, propionic and butyric acids, sodium, potassium and calcium formates, acetates, propionates and butyrates and sodium, potassium and calcium diacetates are used. The dosage is 0.25 to 0.8% of the weight of the tortillas.

Table 5 given below gives the results of using various quantities of these acids in tortillas on shelf life:

Table 5

Effect of Acetic, Propionic and Butyric Acids in Prolonging the Shelf Life of Tortillas at 25°C

| Type of Additive and Dose | Shelf Life, Hours |
|---|---|
| 0.25% Acetic Acid | 36 |
| 0.35% Acetic Acid | 48 |
| 0.15% Propionic Acid | 36 |
| 0.25% Propionic Acid | 48 |
| 0.15% Butyric Acid | 48 |
| Control | 12 |

These substances also have synergistic effects when combined. Table 6 shows the unusual results obtained by using them in combination.

Table 6

Effect of Combinations of Low Molecular Weight Fatty Acids And/Or Their Sodium Salts in Increasing the Shelf Life of Tortillas at 37°C

| Additive Combination and Dose | Shelf Life, Hours |
|---|---|
| 0.20% Acetic Acid + 0.25% Sodium Formate | 60 |
| 0.20% Acetic Acid + 0.30% Sodium Formate | 72 |
| Control I, 0.20% Acetic Acid alone | 36 |
| Control II, no additive | 6 |

These substances are also synergistic in combination with other agents, as explained in copending applications

EXAMPLE 1

Nixtamalized corn flour is incorporated by a dough mixer into water in which acetic acid has been introduced to the extent of 4% of the tortillas. The result is increased flexibility after storage without loss of moisture as shown in Table 2.

EXAMPLE 2

Instead of acetic acid, acetic anhydride is used. The effect is comparable.

EXAMPLE 3

Instead of acetic acid, propionic acid is used. The effect is comparable.

EXAMPLE 4

Instead of acetic acid, propionic anhydride is used. The effect is comparable.

EXAMPLE 5

Tortilla dough is made by mixing nixtamalized tortilla flour with water in a dough mixer and the acetic anhydride to the extent of 2% of the tortillas is then incorporated in a 20% water solution, allowance being made for the added water in the dough. This is thoroughly mixed in the dough. The result after cooking the tortillas is comparable to that set forth in Example 1.

EXAMPLE 6

The effect in retarding microbiological spoilage is brought out in Tables 5 and 6. For this purpose the agents may be added in the same way as to prevent staling.

In view of my invention and disclosure, variations and modifications to meet individual whim or particular need will doubtless become evident to others skilled in the art to obtain all or part of the benefits of my invention without copying the process and composition shown, and I, therefore, claim all such insofar as they fall within the reasonable spirit and scope of my claims.

Having thus described my invention what I claim as new and desire to secure by Letters Patent is:

1. A tortilla which maintains its flexibility after storage without moisture loss, essentially consisting of nixtamalized corn or nixtamalized corn flour and a compound of the class consisting of acetic acid, propionic acid and their anhydrides in a concentration of 1 to 4% by weight.

2. A tortilla of claim 1, in which the additive is a compound of the class consisting of acetic acid and acetic anhydride.

3. A tortilla of claim 1, in which the additive is a compound of the class consisting of propionic acid and propionic anhydride.

4. Tortilla dough essentially consisting of nixtamalized corn or nixtamalized corn flour, water, and a compound of the class consisting of acetic acid, propionic acid, and their anhydrides in a concentration of 1 to 4% of the tortillas.

5. Tortilla dough of claim 4, in which the additive is a compound of the class consisting of acetic acid, and acetic anhydride.

6. Tortilla dough of claim 4, in which the additive is a compound of the class consisting of propionic acid and propionic anhydride.

7. A process of producing tortilla dough which will produce tortillas of improved flexibility after storage without loss of moisture for a period of time, which comprises mixing nixtamalized corn or nixtamalized corn flour with water to make tortilla dough and incorporating in the dough from 1 to 4% on the weight of the tortillas of a compound of the class consisting of acetic acid and propionic acid and their anhydrides.

8. A process of claim 7, in which the compound is of the class consisting of acetic acid and acetic anhydride.

9. A process of claim 7, in which the compound is of the class consisting of propionic acid and propionic anhydride.

* * * * *